United States Patent [19]

Chesley

[11] Patent Number: 5,343,208

[45] Date of Patent: Aug. 30, 1994

[54] RADAR WITH INDIVIDUALLY OPTIMIZED DOPPLER FILTERS

[75] Inventor: Donald E. Chesley, Maple Shade, N.J.

[73] Assignee: Martin Marietta Corporation, Moorestown, N.J.

[21] Appl. No.: 113,040

[22] Filed: Aug. 28, 1993

[51] Int. Cl.$^5$ ............... G01S 7/295; G06F 15/332
[52] U.S. Cl. .................... 342/196; 364/726
[58] Field of Search .......... 342/196, 116; 364/726, 364/827

[56] References Cited

U.S. PATENT DOCUMENTS

| | | | |
|---|---|---|---|
| 3,783,258 | 1/1974 | Chwastyk | 364/726 |
| 4,075,630 | 2/1978 | Shapiro et al. | 342/196 |
| 4,622,552 | 11/1986 | Andrews et al. | 342/196 |
| 4,680,589 | 7/1987 | Bryant et al. | 342/196 |
| 4,689,762 | 8/1987 | Thibodeau, Jr. | 364/726 |

*Primary Examiner*—Gilberto Barrón, Jr.
*Attorney, Agent, or Firm*—W. H. Meise; C. A. Nieves; S. A. Young

[57] ABSTRACT

An FFT-like array architecture (500), for use on the Doppler filters of a radar system, includes a plurality of stages (505, 506) of weighted butterflies (501, 502, 503, 504), in which each butterfly is provided with four weighting multipliers (410–416). The weights (W1, W2, W3, W4) of the multipliers of the array are determined by an iterative process in which the input and output signals are selected, the input signals are applied to the array, and the actual output signals are compared with the desired output signals to produce error signals. The error signals are backpropagated through the array, to correct the weights. The input signals are again applied, and the corrected output signals are again compared with the desired output signals to produce new error signals, which are again backpropagated to correct the weights. This procedure is used iteratively until the array "learns" the weights which give the desired output signals. In a radar context, narrower Doppler filters and lower sidelobe result over a given range of frequencies.

2 Claims, 7 Drawing Sheets

RADAR WITH INDIVIDUALLY OPTIMIZED DOPPLER FILTERS

This invention relates to Doppler signal processing in radar systems, and more particularly to processing by means of an FFT-like architecture, in which each individual butterfly of the FFT-like architecture includes plural weighting arrangements for individual optimization.

BACKGROUND OF THE INVENTION

Figure 1:
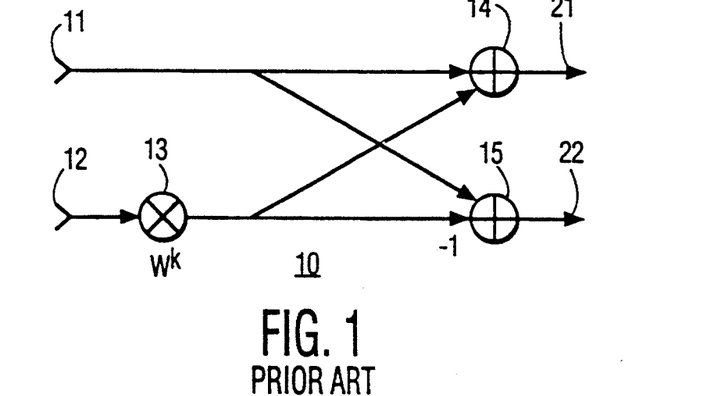
FIG. 1 is a simplified block diagram of a prior-art butterfly processor.

FIG. 1 illustrates a conventional prior-art butterfly 10, including first and second input terminals 11 and 12, respectively, and first and second output terminals 21 and 22. Signals applied to first input terminal 11 are coupled to noninverting input ports of summing circuits (summers) 14 and 15. Signals applied to second input terminal 12 are weighted in a multiplier 13 with a weight $W^K$, and the resulting weighted signal is applied to a further noninverting input port of summing circuit 14, and to an inverting input port of summing circuit 15. Summing circuit 14 sums the signal from first input terminal 11 with the weighted signal to produce an output signal on first output terminal 21. Summing circuit 15 subtracts the weighted signal from the signal applied to input terminal 11 to produce an output signal on second output terminal 22.

Figure 2:
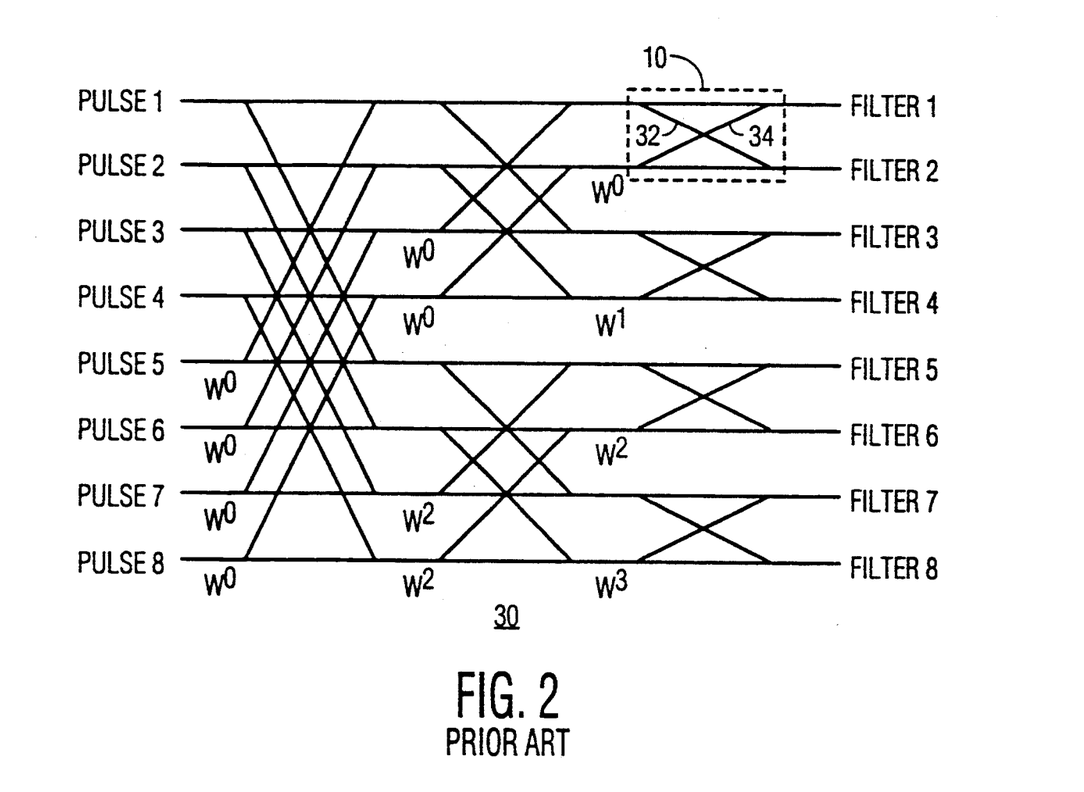
FIG. 2 is a simplified representation of a prior-art eight-point FFT architecture using butterflies such as that of FIG. 1.

FIG. 2 illustrates a typical prior-art eight-point Fast Fourier Transform (FFT) architecture 30 in a conventional representation. In the representation of FIG. 2, each butterfly, corresponding to 10 of FIG. 1, is illustrated as a pair of crossed lines. One such pair of crossed lines 32, 34 is identified by a dash-line rectangular surround designated 10. Each butterfly of FIG. 2 bears a marking in the form $W^K$ adjacent to the lower left crossed line, where $$W^K = e^{-j2\pi K/8} \quad (1)$$

The indicated value of $W^K$ is applied in FIG. 2 to the multiplier, corresponding to multiplier 13 of FIG. 1, which is associated with each butterfly.

The FFT structure of FIGS. 2 takes advantage of computational redundancies in the Discrete Fourier Transform (DFT) to reduce the total number of computations required to produce the filtered output signal. In radar applications, one of the primary uses of the FFT is in pulse Doppler filtering, in which it effectively performs the function of a bank of narrow-band filters, each tuned to a different Doppler frequency, to thereby separate or sort radar returns or echoes according to the velocities of the targets. This ability to sort by the target velocity, in turn, is valuable in that it allows suppression of signals relating to stationary or slowly-moving targets (clutter), thereby making fast-moving targets such as aircraft more obvious. The input signals applied to the Pulse 1, Pulse 2; Pulse 3...Pulse 8 input ports of FFT architecture 30 of FIG. 2 are range traces from a succession of transmitted pulses; i.e. the echo occurring at a particular time (corresponding to a particular range) after transmission of each of eight successive pulses. Thus, the signals applied to the FFT 30 input ports are "windowed", in that they represent a finite number (eight) sequential samples out of an indefinite number of samples. Those skilled in the art know that such windowing can result in undesirable sidelobes in the system output. These sidelobes, in the Doppler filter context, result in cross-coupling of signals among the filters. The cross-coupling means that the signal at the output of each filter, which ideally represents only those returns from targets moving at a particular velocity, will be contaminated by return signals "leaking" from other Doppler frequencies. When attempting to detect a moving target (an incoming missile) in the presence of large, slowly moving clutter (moving waves, in a maritime context), the sidelobes may allow the clutter to obscure the target. It is very important to detect missiles as early as possible, so that time remains after detection in which countermeasures may be taken. Conventional FFT Doppler filters, therefore, are designed with very low sidelobe levels, but the concomitants of low sidelobe levels are (a) a relatively wide frequency bandwidth, and (b) high losses compared with high sidelobe designs. The relatively wide bandwidth in turn means that mutually adjacent filters overlap each frequency, so that returns from a particular target appear in the outputs of plural filters, and the target velocities therefore can only be generally determined.

Figure 3:
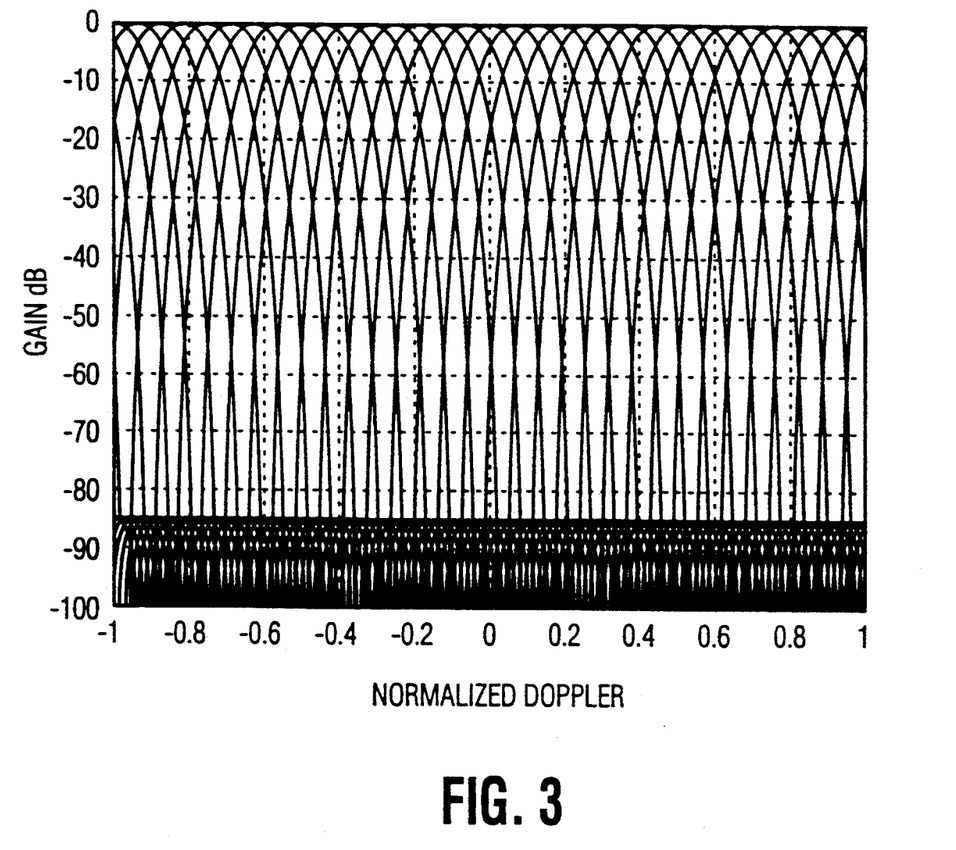
FIG. 3 is a filter response plot of the architecture similar to that of FIG. 2, but with sixteen points, for a particular window weighting to achieve a given sidelobe level.

The sidelobe levels of the filters formed by the FFT structure of FIG. 2 using the butterflies of FIG. 1 can be controlled by applying a weighting function to the windowed data applied to input ports designated Pulse 1–Pulse 8; such weighting functions generally attenuate the signals at the ends of the windows (the Pulse 1 and Pulse 8 input ports) relative to the signals near the center of the window (the Pulse 4 and Pulse 5 input ports). For example, in high Clutter Improvement Factor (CIF) applications in which ultra-low sidelobes are required, an 85-dB Dolph-Chebychev window weighting function can be used. Such a weighting applied to an FFT structure similar to that of FIG. 2, but with 16 points instead of eight points, results in the response illustrated in FIG. 3, in which the sidelobes are uniformly 85 dB below the filter peak response. FIG. 3 plots amplitude-versus-normalized-frequency response from each of the sixteen output ports of a sixteen-point FFT structure, superposed upon each other. The illustrated plot has 33 separate peaks, two for each of the sixteen filters except the zero-frequency filter, which displays a peak at a normalized Doppler frequency of zero, and a peak at normalized frequencies of +1 and -1. Each filter, other than the zero-frequency filter, exhibits a peak in the positive Doppler frequency region and another in the negative region at a distance of 1 normalized doppler interval from the positive peak, e.g. the filter which peaks at 0.8 also peaks at −0.2. The filter responses illustrated in FIG. 3 are normalized to an amplitude of zero dB, which represents a filter loss of 2.5 dB at the peak of the response. The filter responses are also relatively broad, with a null to null bandwidth equal to 0.4 of Doppler space.

In many cases, clutter may be concentrated at particular frequencies, as for example clutter due to wind motion of vegetation and wave motion at sea tends to be at very low Doppler frequencies. It would be desirable to be able to provide the filters of an FFT Doppler filter bank with suppression at particular frequencies at which clutter is known to occur, while using low-loss, relatively narrow bandwidth filters at other frequencies.

SUMMARY OF THE INVENTION

An array of weighted FFT butterflies, includes first, second, third and fourth array input ports adapted for receiving signals to be processed, and first, second, third and fourth array output ports. The array also includes first, second, third and fourth weighted butterflies, each of the first, second, third and fourth weighted butterflies including first and second weighted butterfly input terminals and first and second weighted butterfly output terminals. A coupling arrangement couples (a) the first input terminal of the first butterfly to the first input port of the array, (b) the first input terminal of the second weighted butterfly to the second input port of the array; (c) the second input terminal of the first weighted butterfly to the third input port of the array; (d) the second input terminal of the second weighted butterfly to the fourth input port of the array; (e) the first input terminal of the third weighted butterfly to the first output terminal of the first weighted butterfly; (f) the second input terminal of the third butterfly to the first output terminal of the second weighted butterfly; (g) the first input terminal of the fourth butterfly to the second output terminal of the first butterfly; (h) the second input terminal of the fourth butterfly to the second output port of the second butterfly; (i) the first output port of the first butterfly to the first output port of the array; (j) the second output terminal of the third butterfly to the second output port of the array; (k) the first output terminal of the fourth butterfly to the third output port of the array; (l) the second output terminal of the fourth butterfly to the fourth output port of the array. Each weighted butterfly includes (a) first and second weighting means coupled to the first input terminal of the weighted butterfly for multiplying signals applied to the first input terminal by first and second weights for forming first and second weighted signals, respectively; (b) third and fourth weighting arrangements coupled to the second input terminal of the weighted butterfly for multiplying signals applied to the second input terminal by third and fourth weights, respectively, for forming third and fourth weighted signals; (c) a first summer coupled to the first and third weighting arrangements for summing together the first and third weighted signals for generating a first summed signal at the first output terminal of the weighted butterfly; (d) a second summer coupled to the second and fourth weighting arrangements for summing together the second and fourth weighting signals for generating a second summed signal at the second output terminal of the weighted butterfly. According to an aspect of the invention, the first, second, third and fourth weights of the first, second, third and fourth weighting arrangements are established by an iterative learning procedure, in which the output signal in response to a particular input signal is compared with a desired output signal, the difference taken to produce an error signal, and the error signal is backpropagated through the array and used to correct the weights.

DESCRIPTION OF THE INVENTION

Figure 4:
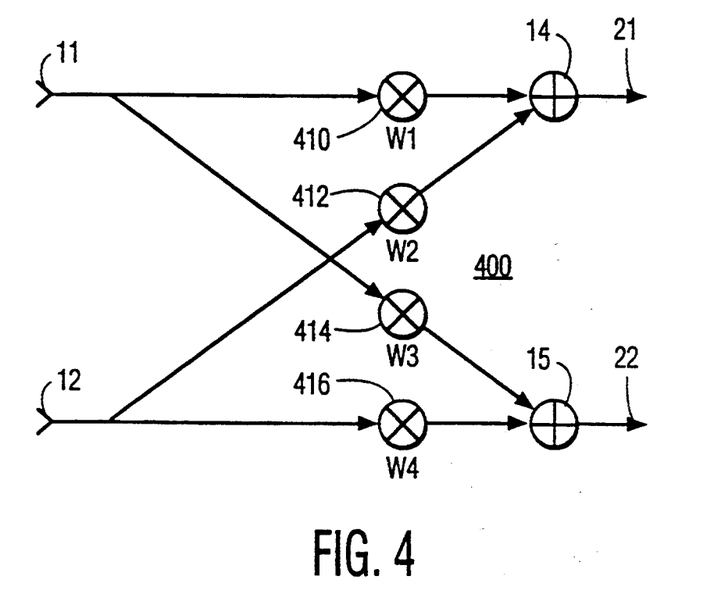
FIG. 4 is a simplified block diagram of a butterfly according to the invention, which may be used in the FFT architecture of FIG. 2.

Elements of the weighted butterfly of FIG. 4 corresponding to those of FIG. 1 are designated by like reference numerals. In FIG. 4, input signals applied to input terminal 11 are multiplied by a weight W1 in a multiplier 410, and by a weight W3 in a multiplier 414. The input signals applied to input port 12 are multiplied by a weight W2 in a multiplier 412, and by a weight W4 in a multiplier 416. The weighted signals produced by multipliers 410 and 412 are added in a summer 14, and the weighted signals produced by multipliers 414 and 416 are summed or in summer 15.

In order to achieve the desired narrow bandwidth filters simultaneously with low sidelobe levels, the weights of the various multipliers of each butterfly of the array must be specified. Attempts to determine a closed-form solution for the weights have not been successful, due to the difficulty of choosing "shared" coefficients, which are those weights which affect more than one filter. However, iterative training techniques such as are used in neural network theory, have been successfully used. The ultimate goal of the properly weighted system is to maximize the ratio of output signal to interference taken over all the filters. For each filter of interest in the filter bank, that filter must respond with a peak response when the input pulse-to-pulse phase progression corresponds to its center Doppler frequency. Further, that same filter should ideally respond with zero output in the presence of clutter or noise inputs, where clutter is defined to be a large-amplitude, low Doppler phase progression input, and noise is defined to be a plurality of input vectors spread equally over all Doppler frequency. Thus, the input signal may be specified, and a corresponding desired output signal is known. In general, the training is accomplished by initializing the weights to starting values, followed by separately applying all signal, clutter and noise inputs, one by one, and storing the output signals. The difference between the actual output signal of the array and the desired output signal is taken to produce an error. The error is propagated back through the array, and is used to adjust the weights. This procedure is performed iteratively, so that the actual array output signals converge toward the desired values. When the overall mean-squared error decreases below a preset threshold value, the weights are deemed to be determined. The array is then ready for use.

The initialization step may be performed by selecting weights determined by a prior-art closed-form solution such as Dolph-Chebychev.

Conceptually, taking the view that the FFT-like array is a neural net, each butterfly becomes, in the analogy, a two-input, two-output pure linear neuron, as described in MATLAB Neural Network Toolbox User's Guide, published Jun. 1992, and available from THE MATHWORKS, INC., Cochituate Place, 24 Prime Parkway, Natick, Mass. 01760.

Figure 5:
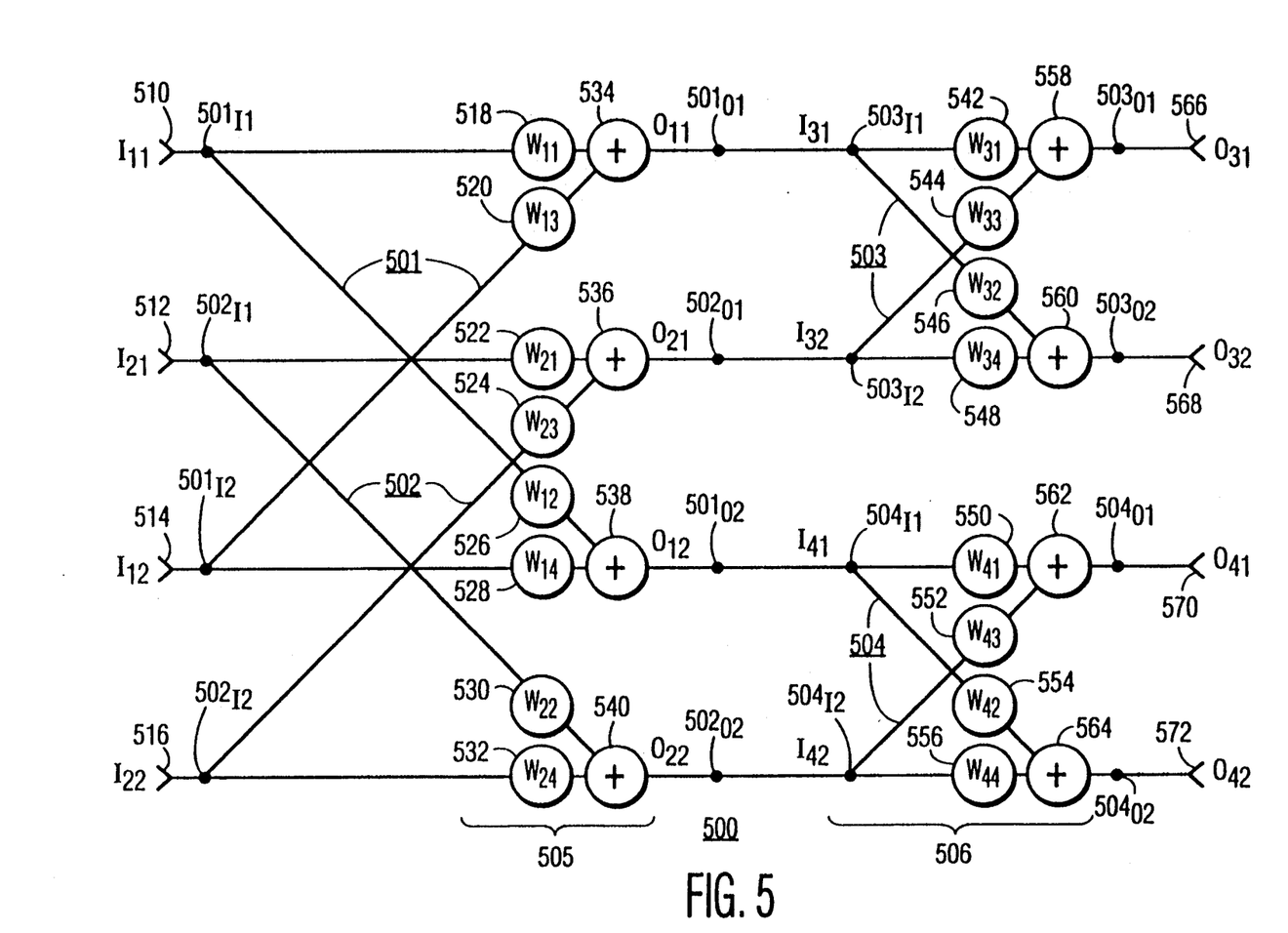
FIG. 5 illustrates portions of an FFT-like array according to the invention using the butterfly of FIG. 4.

FIG. 5 illustrates a four-input, four-output FFT-like array architecture using butterflies such as that of FIG. 4. In FIG. 5, a first array stage 505 includes a first butterfly 501 similar to butterfly 400 of FIG. 4, which has its first input port $501_{11}$ connected to receive signal from array input port 510, and its second input port $501_{12}$ connected to receive signal from array input port 514. Butterfly 501 includes weighting multipliers 518 and 526 connected to receive signal from input port $501_{11}$, for weighting the signal by weights $W_{11}$ and $W_{12}$, respectively, and also includes weighting multipliers 520 and 528 connected to receive signal from input port $501_{12}$, for weighting the signal by weights and $W_{14}$, respectively. A second butterfly 502 of first array stage 505 of FIG. 5 has its first input port $502_{11}$ connected to receive signal from array input port 512 and its second input port $502_{12}$ connected to receive signal from array input port 516. Butterfly 502 includes weighting multipliers 522 and 530 connected to receive signal from input port $502_{11}$, for weighting the signal by weights and $W_{22}$, respectively, and also includes weighting multipliers 524 and 532 connected to receive signal from input port $502_{12}$, for weight the signal by weights $W_{23}$ and $W_{24}$, respectively, A pair of summing circuits 534 and 538 of first butterfly 501 sum the weighted signals from weighting multiplier sets 518, 520 and 526, 528, respectively. A pair of summing circuits 536, 540 of second butterfly 502 sum the weighted signals from weighting multiplier sets 522, 524 and 530, 532, respectively. First butterfly 501 and second butterfly 502 together constitute a first stage 505 of array 500 of FIG. 5. The output signals from summing circuits 534 and 538 of first butterfly 501 are applied to first butterfly output ports $501_{01}$ and $501_{02}$, respectively, and the output signals from summing circuits 536 and 540 are applied to second butterfly output ports $502_{01}$ and $502_{02}$, respectively. Thus, the input and output signals of first and second butterflies 501 and 502 constitute the input and output signals, respectively, of first array stage 505.

Also in FIG. 5, a third butterfly 503 of a second stage 506 of array 500 has its first input port $503_{11}$ connected to receive signal from output port $501_{01}$, and its second input port $503_{12}$ connected to receive signal from output port $502_{01}$. Butterfly 503 includes weighting multipliers 542 and 456 connected to receive signal from input port $503_{11}$, for weighting the signals by weights $W_{31}$ and $W_{32}$, respectively, and also includes weighting multipliers 544 and 548 connected to receive signal from input port $503_{12}$, for weighting the signal by weights by $W_{33}$ and $W_{34}$, respectively. A fourth butterfly 504 of second stage array stage 506 of array 500 of FIG. 5 has its first input port $504_{11}$ connected to receive signal from output port $501_{02}$ of first array stage 505. Butterfly 504 includes weighting multipliers 550 and 554 connected to receive signal from input port $504_{11}$, for weighting the signal by weights $W_{41}$ and $W_{42}$, respectively, and also includes weighting multipliers 552 and 556 connected to receive signal from input port $504_{12}$, for weighting the signal by weights $W_{43}$ and $W_{44}$, respectively. a pair of summing circuits 558 and 560 of third butterfly 503 sum the weighted signals from weighting multiplier sets 542, 546 and 544,548, respectively. a pair of summing circuits 562 and 564 of fourth butterfly 504 sum the weighted signals from weighting multiplier sets 530, 534 and 532, 536, respectively. Third butterfly 503 and fourth butterfly 504 together constitute second stage 506 of array 500 of FIG. 5. The output signals from summing circuits 558 and 560 of third butterfly 503 are applied to third butterfly output ports $503_{01}$, $503_{02}$, respectively, corresponding to array 500 output ports 566 and 568, respectively, and the output signals from summing circuits 562 and 564 are applied to fourth butterfly output ports $504_{01}$ and $504_{02}$, respectively, which correspond to array 500 output ports 570 and 572, respectively.

In FIG. 5, the four input signals $I_{11}$, $I_{21}$, $I_{12}$, and $I_{22}$ are applied to input ports 510, 512, 514 and 516, respectively. A mathematical input signal Matrix I may be defined, which contains N input signal sets $$I = \begin{bmatrix} I_{11}(1) & & I_{11}(N) \\ I_{12}(1) & & I_{12}(N) \\ I_{21}(1) & \cdots & I_{21}(N) \\ I_{22}(1) & & I_{22}(N) \end{bmatrix} \quad (2)$$

where each column constitutes a signal set, and only the first (1) and $N^{th}$ (N) sets are explicitly set forth. Matrix I contains four rows, one for each input port of the FFT-like structure of FIG. 5. Within a column of Matrix I, one input signal is provided for each input port 510, 512, 514 and 516 of FIG. 5.

Also in FIG. 5, four output signals $O_{31}$, $O_{32}$, $O_{41}$ and $O_{42}$ are associated with output ports 566, 568, 570, and 572, respectively. An actual output signal matrix 0 may be defined, which similarly contains N active signal output sets $$O = \begin{bmatrix} O_{31}(1) & & O_{31}(N) \\ O_{32}(1) & & O_{32}(N) \\ O_{41}(1) & \cdots & O_{41}(N) \\ O_{42}(1) & & O_{42}(N) \end{bmatrix} \quad (3)$$

The corresponding desired output signal matrix D is $$D = \begin{bmatrix} D_{31}(1) & & D_{31}(N) \\ D_{32}(1) & & D_{32}(N) \\ D_{41}(1) & \cdots & D_{41}(N) \\ D_{42}(1) & & D_{42}(N) \end{bmatrix} \quad (4)$$

Two stages 505, 506 of weighting are interposed between input terminals 510, 512, 514, 516 and output terminals 566, 568, 570 and 572 in FIG. 5. First stage 502 includes multipliers or weighting operators 518, 520, 522, 524, 526, 528, 530 and 532, together with summers 534, 536, 538 and 540. The first stage produces output signals $O_{11}$, $O_{21}$, $O_{12}$, and $O_{22}$, which are applied to a second stage. Second stage 506 includes multipliers or weighting operators 542, 544, 546, 548, 550, 552, 554 and 556, together with summers 558, 560, 562 and 564. The output signal sets $O_{11}$, $O_{21}$, $O_{12}$, and $O_{22}$ produced by first stage 502 in response to input signal matrix I are represented by an intermediate output signal matrix $O_I$ $$O_I = \begin{bmatrix} O_{11}(1) & & O_{11}(N) \\ O_{12}(1) & & O_{12}(N) \\ O_{21}(1) & \cdots & O_{21}(N) \\ O_{22}(1) & & O_{22}(N) \end{bmatrix} \quad (5)$$

The input signal sets to the second stage 504 are represented by an intermediate input signal matrix $I_I$ $$I_I = \begin{bmatrix} I_{31}(1) & & I_{31}(N) \\ I_{32}(1) & & I_{32}(N) \\ I_{41}(1) & \cdots & I_{41}(N) \\ I_{42}(1) & & I_{42}(N) \end{bmatrix} \quad (6)$$

The matrix A of weights for the first stage is $$A = \begin{bmatrix} W_{11} & W_{13} & 0 & 0 \\ W_{12} & W_{14} & 0 & 0 \\ 0 & 0 & W_{21} & W_{23} \\ 0 & 0 & W_{22} & W_{24} \end{bmatrix} \quad (7)$$

The matrix B of weights for the second stage is
The transformation matrix T between first stage 502 and second stage 504 is $$B = \begin{bmatrix} W_{31} & W_{33} & 0 & 0 \\ W_{32} & W_{34} & 0 & 0 \\ 0 & 0 & W_{41} & W_{43} \\ 0 & 0 & W_{42} & W_{44} \end{bmatrix} \quad (8)$$

$$T = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \quad (9)$$

Note that $I_I = TO_I$.

Figure 6:
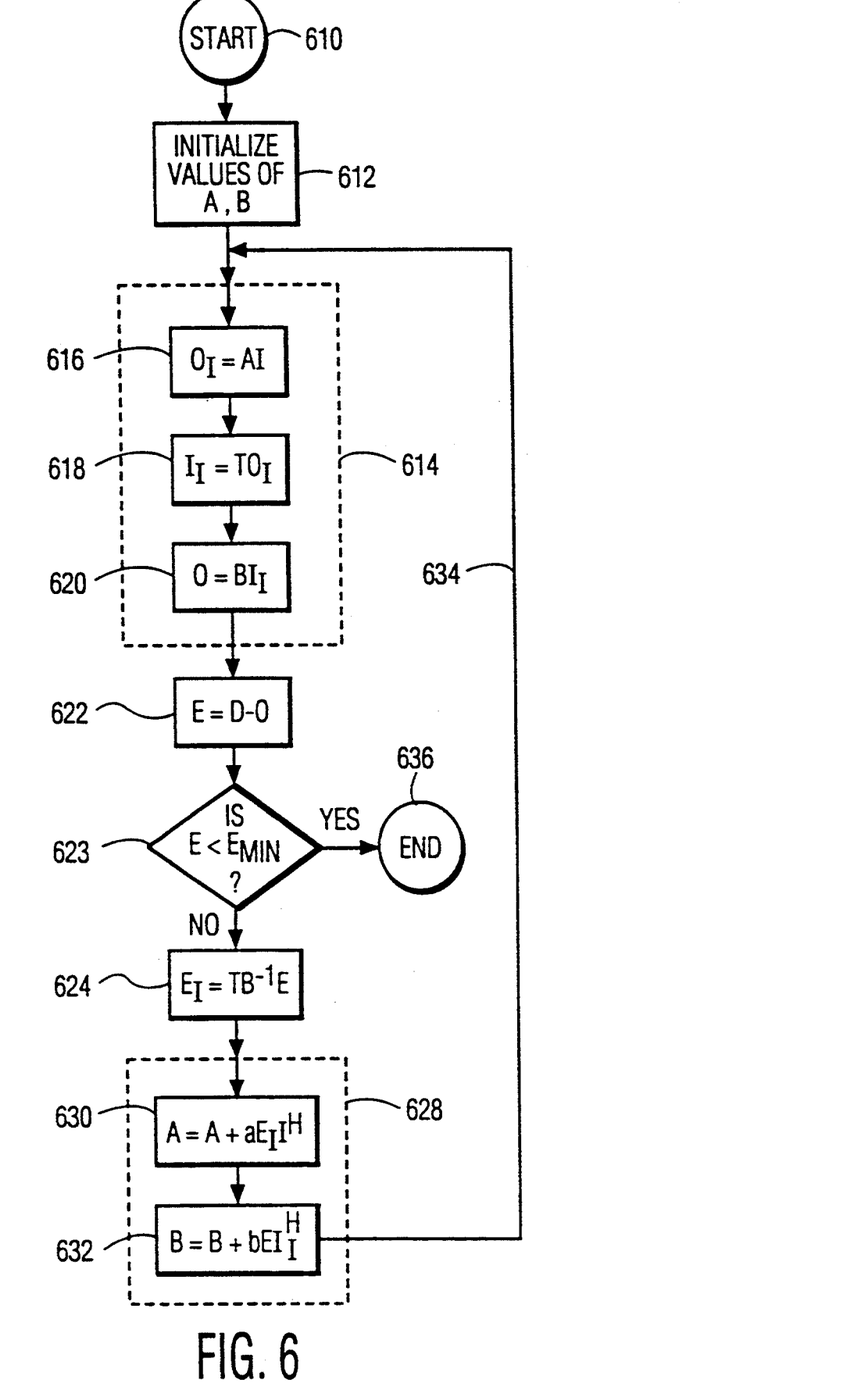
FIG. 6 is a flow chart illustrating logic to aid in explaining how the weights are determined.

A computer method for performing the learning procedure is illustrated in the flow chart of FIG. 6. In FIG. 6, the logic flow begins at a START block 610, and proceeds to an initializing step represented by block 612. As mentioned, the initial values of A and B may be selected as those required for a particular prior-art weighting, such as Dolph-Chebychev. From block 612, the logic flows to a further block 614, which represents calculation of the output signal matrix 0 by steps represented as blocks 616, 618 and 620. Block 616 represents multiplication of input signal matrix I by first stage weight matrix A to produce intermediate output signal matrix $O_1$. Block 618 represents multiplication of intermediate output signal matrix $O_1$ by transformation matrix T to produce intermediate input signal matrix $I_1$, and block 620 represents multiplication of matrix $I_1$ by second stage weight matrix B to produce the output signal matrix 0. Once the actual output signal matrix 0 which results from applied input signal matrix I is determined, the difference matrix E between the actual output signal matrix 0 and the desired signal matrix D can be determined in block 622 by subtracting the 0 matrix from the D matrix. The mean square value of the elements of difference matrix E is computed to form a single positive value, which is compared with a threshold value $E_{MIN}$ in a decision block 623. during the first pass through the logic, the error may be expected to exceed $E_{MIN}$, whereupon the logic leaves decision block 623 by the NO output, and proceeds to block 624. "Backpropagation" of the error matrix through the second stage to the output of the first stage is accomplished in block 624 by performing the matrix product $TB^{-1}E$, where $B^{-1}$ is the matrix inverse of matrix B; the matrix product generates an intermediate error matrix $E_1$. Intermediate error matrix $E_1$ represents the incremental signal required at the output of first stage 505 of FIG. 5 to cause the second stage output signal matrix 0 equal to desired signal matrix D. As so far described, the errors have been backpropagated to the output of first stage 505 of FIG. 1. In general, the error at the output of a given stage is used to adjust the weights of that stage in the learning process. Consequently, for the embodiment of FIG. 5, it is not necessary to backpropagate the error through first stage 505. However, if the structure of FIG. 5 is a portion of a larger N-stage structure, one or more additional steps of backpropagation would be performed following block 624, as by multiplying $E_1$ by matrix $A^{-1}$. After all backpropagation has been performed, the logic flows to a block 628. The A and B weighting matrices are updated in block 628. In block 628, a block 630 represents updating of the A weighting matrix by adding to its current value the product $aE_1I^H$, $A = A + aE_1I^H$ where the superscript H represents a Hermitean operation, and a is a scalar selected to control the rate at which the error decreases. Block 632 represents the updating of the B weighting matrix, $B = B + bEI_1^H$, where b is a rate-of-descent controlling scalar. If more stage of FFT-like architecture were involved, with weight matrices C, D, etc., these corrections would also be performed in block 628 following block 632. From block 628, the logic flows by a logic path 634 back to block 614, to once again determine the output signal matrix 0 in response to a known I, subtract 0 from D to determine E, and compare E with $E_{MIN}$. So long as the mean-square value determined from error matrix E exceeds threshold value $E_{MIN}$ representing the minimum acceptable error, the logic will leave decision block 623 by the NO output, and the logic will continue to traverse blocks 624 and 628 of FIG. 6, and iteratively repeating the loop. Eventually, error matrix E will be less than the desired error $E_{MIN}$, and decision block 623 will route the logic to END block 636, whereupon the then-current A and B weighting matrices fit the criteria for operation of the FFT-like structure of FIG. 5.

The weights established by the A and B weighting matrices as determined by the logic of FIG. 5 are those which, for a given input, result in the desired output signal matrix D within the error established by the $E_{MIN}$ matrix. For an unweighted input signal, the desired output signal matrix may specify a null at a particular Doppler.

The weights are established by the following procedure.

Suppose it were desired to have a sidelobe level of −85 dB to suppress clutter over the normalized Doppler space of ±0.03. For purposes of an example, further assume that a sixteen-point FFT-like architecture is to be used. The number of points may, of course, be 32, 64, 128 or more. As a first step, a set of input signal vectors is defined for those filters which are to have peaks, and a set of input clutter vectors is defined for those filters which are to have zeroes or nulls. There are a total of sixteen potential filters in a sixteen-point structure, as described above in conjunction with FIG. 3. Of these sixteen potential filters, seven have responses which overlap the Doppler space lying between −0.03 and +0.03 at levels above −85 db. Thus, no more than nine of the potential filters can be used for target detection. These filters extend from +0.3 to +0.97 in Doppler space. An input signal matrix I is therefore defined in the form illustrated in FIG. 8.

Figure 8:
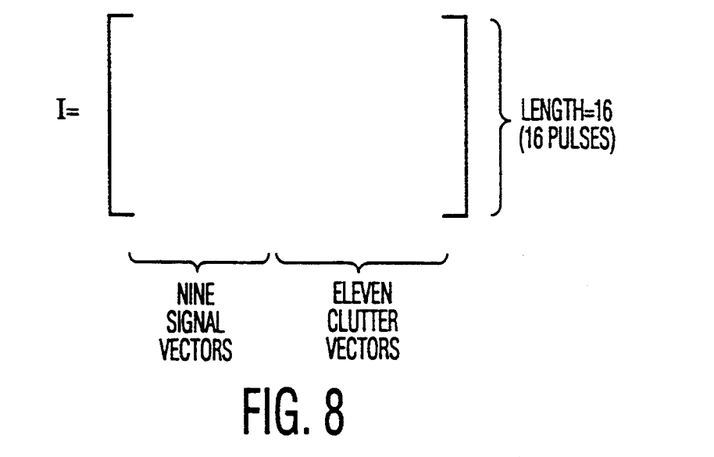
FIG. 8 illustrates the form of an I matrix for use with the method of FIG. 6.
Figure 9:
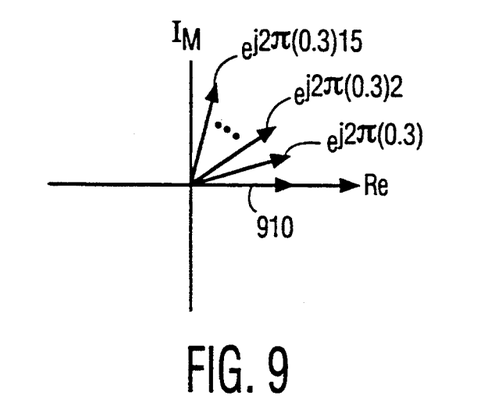
FIG. 9 represents certain elements of a column vector which may be used in a matrix such as that of FIG. 8.

Each vector (signal or noise) element of the matrix of FIG. 8 is a complex number set sixteen pulses long representing phase rotation through the complex plane at the rate established by the phase progression characteristics of the particular Doppler frequency which it represents. As a first example, the clutter vector at zero Doppler is represented by the sixteen-element column matrix $$\begin{bmatrix} 1 \\ 1 \\ 1 \\ \cdot \\ \cdot \\ \cdot \\ 1 \\ 1 \end{bmatrix} \quad (10)$$

and as a second example, the clutter vector at +0.3 normalized Doppler is the sixteen-element column matrix $$\begin{bmatrix} e^{j2\pi(0)} \\ e^{j2\pi(0.3)} \\ e^{j2\pi(0.3)2} \\ \cdot \\ \cdot \\ \cdot \\ e^{j2\pi(0.3)15} \end{bmatrix} \quad (11)$$

where the top element corresponds to the unity vector 910 lying on the real (Re) axis of the complex plane of FIG. 9. FIG. 9 also illustrates the other elements of column matrix 11.

Figure 10:
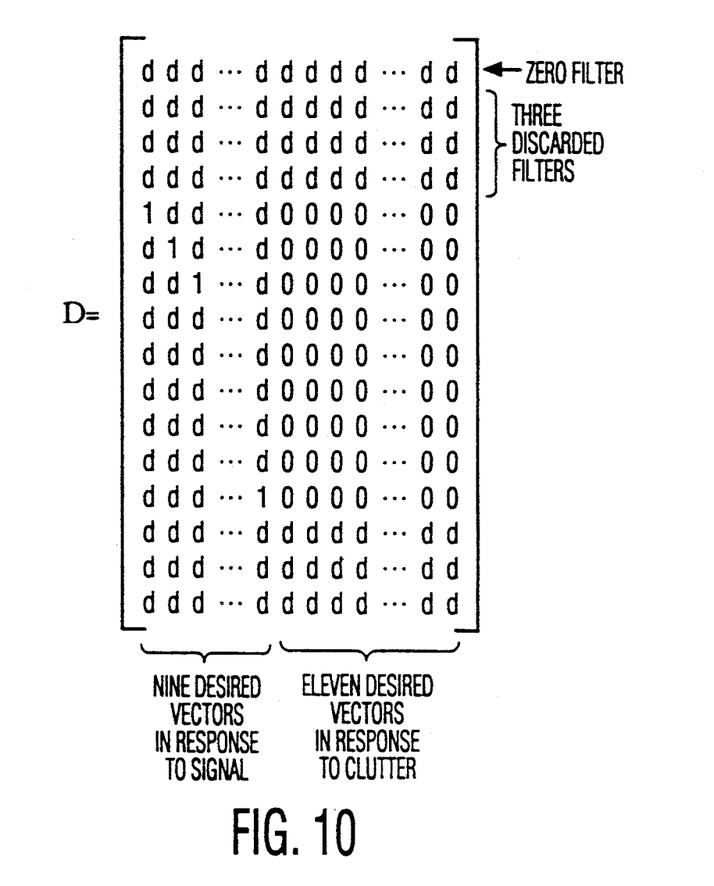
FIG. 10 illustrates the form of a D matrix for use in conjunction with the method of FIG. 6 with input matrix of FIG. 8.

Once input matrix I is established as indicated by FIG. 8, the resulting desired output signal matrix D may be specified in the form illustrated in FIG. 10.

Figure 7:
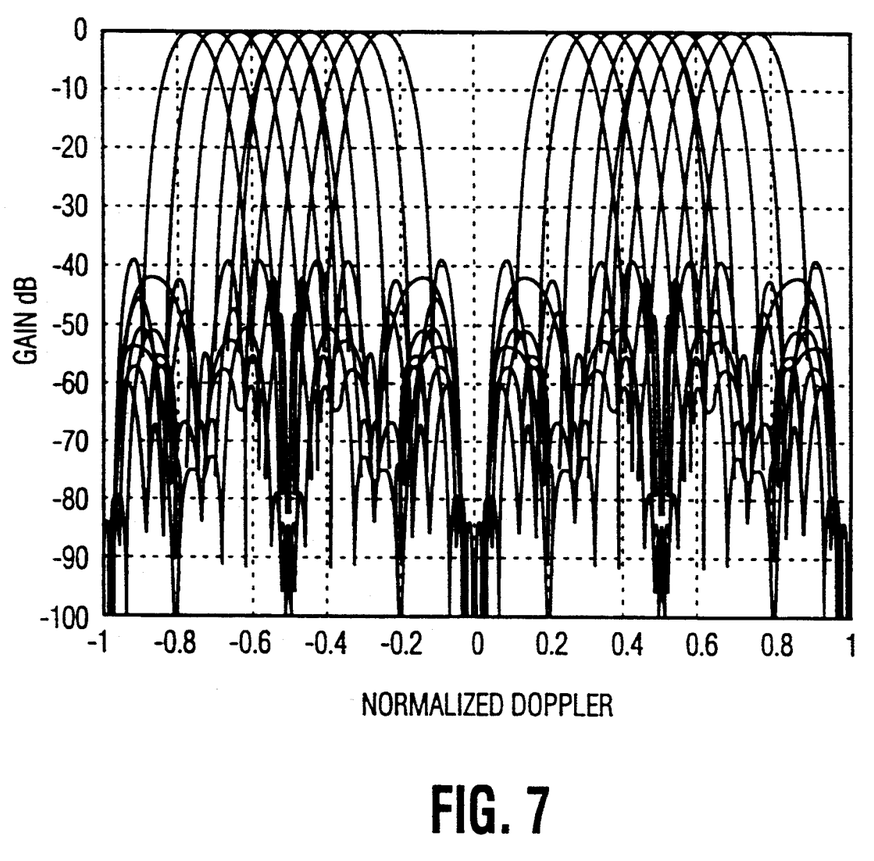
FIG. 7 is a filter response plot of a sixteen-point FFT-like architecture according to the invention, optimized by the logic described in conjunction with FIG. 6.

In the D matrix of FIG. 10, a "1" entry represents a peak response, a "0" represents a zero response or a null, and a "d" represents "don't care". Thus, the second, third and fourth rows of "d's" indicates that these three filters are discarded. The discarding of the filter is achieved, in following processing, by ignoring the actual-signal-minus-desired-signal error for that particular entry. In the left-most column of the D matrix of FIG. 10, the fifth element from the top is a "1", representing a peak response in response to signal, the "d's" to its right in the same row represent indifference as to the nature of the response to the other signals, and the "0's" further to the right in the fifth row indicate that zero responses are to be produced in response to clutter. The weight determination proceeds as described above in relation to FIG. 6. FIG. 7 represents the result of the process, with the desired null over the range −0.03 to +0.03.

Other embodiments of the invention will be apparent to those skilled in the art. For example, the number of multipliers may be reduced in those filters which are discarded during the weight determination.

What is claimed is

1. An array of weighted FFT butterflies, the array comprising;

first, second, third and fourth array input ports adapted for receiving signals to be processed, and first, second, third and fourth array output ports;

first, second, third and fourth weighted butterflies, each of said first, second, third and fourth weighted butterflies including first and second weighted butterfly input terminals and first and second weighted butterfly output terminals; and coupling means for coupling (a) said first input terminal of said first butterfly to said first input port of said array, (b) said first input terminal of said second weighted butterfly to said second input port of said array; (c) said second input terminal of said first weighted butterfly to said third input port of said array; (d) said second input terminal of said second weighted butterfly to said fourth input port of said array; (e) said first input terminal of said third weighted butterfly to said first output terminal of said first weighted butterfly; (f) said second input terminal of said third butterfly to said first output terminal of said second weighted butterfly; (g) said first input terminal of said fourth butterfly to said second output terminal of said first butterfly; (h) said second input terminal of said fourth butterfly to said second output port of said second butterfly; (i) said first output port of said third butterfly to said first output port of said array; (j) said second output terminal of said third butterfly to said second output port of said array; (k) said first output terminal of said fourth butterfly to said third output port of said array; (1) said second output terminal of said fourth butterfly to said fourth output port of said array; and wherein each said weighted butterfly comprises: (a) first and second weighting means coupled to said first input terminal of said weighted butterfly for multiplying signals applied to said first input terminal by first and second weights for forming first and second weighted signals, respectively; (b) third and fourth weighting means coupled to said second input terminal of said weighted butterfly for multiplying signals applied to said second input terminal by third and fourth weights, respectively, for forming third and fourth weighted signals; (c) first summing means coupled to said first and third weighting means for summing together said first and third weighted signals for generating a first summed signal at said first output terminal of said weighted butterfly; (d) second summing means coupled to said second and fourth weighting means for summing together said second and fourth weighted signals for generating a second summed signal at said second output terminal of said weighted butterfly.

2. A method for processing sets of information signals, comprising the steps of:

generating a set of desired ideal output signals;

generating a set of ideal input signals from which the desired ideal output signals are to occur;

applying at least portions of said set of ideal input signals to first, second, third and fourth array input ports of a two-stage array of weighted FFT butterflies, which array includes first, second, third and fourth array output ports in order to generate actual output signals at said first, second, third and fourth array output ports, said array further comprising:

(A) first, second weighted butterflies together constituting a first stage of said array, third and fourth weighted butterflies together constituting a second stage of said array, each of said first and second weighted butterflies of a first stage of said array including first and second weighted butterfly input terminals and first and second weighted butterfly output terminals, each of said third and fourth weighted butterflies of a second stage of said array including first and second weighted butterfly input terminals and first and second weighted butterfly output terminals.

(B) coupling means for coupling (a) said first input terminal of said first butterfly to said first input port of said array, (b) said first input terminal of said second weighted butterfly to said second input port of said array; (c) said second input terminal of said first weighted butterfly to said third input port of said array; (d) said second input terminal of said second weighted butterfly to said fourth input port of said array; (e) said first input terminal of said third weighted butterfly to said first output terminal of said first weighted butterfly; (f) said second input terminal of said third butterfly to said first output terminal of said second weighted butterfly; (g) said first input terminal of said fourth butterfly to said second output terminal of said first butterfly; (h) said second input terminal of said fourth butterfly to said second output port of said second butterfly; (i) said first output port of said third butterfly to said first output port of said array; (j) said second output terminal of said third butterfly to said second output port of said array; (k) said first output terminal of said fourth butterfly to said third output port of said array; (1) said second output terminal of said fourth butterfly to said fourth output port of said array; and (C) wherein each said weighted butterfly comprises (a) first and second weighting means coupled to said first input terminal of said weighted butterfly for multiplying signals applied to said first input terminal by first and second weights for forming first and second weighted signals, respectively; (b) third and fourth weighting means coupled to said second input terminal of said weighted butterfly for multiplying signals applied to said second input terminal by third and fourth weights, respectively, for forming third and fourth weighted signals;

(c) first summing means coupled to said first and third weighting means for summing together said first and third weighted signals for generating a first summed signal at said first output terminal of said weighted butterfly; (d) second summing means coupled to said second and fourth weighting means for summing together said second and fourth weighted signals for generating a second summed signal at said second output terminal of said weighted butterfly;

said method further including the steps of:

taking the difference between said ideal and actual output signals to generate second stage output difference signals;

comparing said second stage output difference signals with a threshold, and if said second stage output signals are less than said threshold, deeming said weights to be the desired weights, and applying said sets of information signal to said array input ports of said array; and if said second stage output signals are greater than said threshold, backpropagating said second stage difference signals through said second stage of said array to thereby form first stage output difference signals, and modifying said weights of said first and second stages in response to said first stage output difference signals and said second stage output difference signals, respectively; and again applying said portions of said set of ideal input signals to said array input ports of said array, and repeating said steps of taking the difference and comparing.

* * * * *